US012060541B2

(12) United States Patent
Farmer et al.

(10) Patent No.: US 12,060,541 B2
(45) **Date of Patent: *Aug. 13, 2024**

(54) MATERIALS AND METHODS FOR MAINTAINING INDUSTRIAL, MECHANICAL AND RESTAURANT EQUIPMENT

(71) Applicant: Locus Solutions IPCo, LLC, Solon, OH (US)

(72) Inventors: Sean Farmer, Ft. Lauderdale, FL (US); Ken Alibek, Solon, OH (US)

(73) Assignee: LOCUS SOLUTIONS IPCO, LLC, Solon, OH (US)

( * ) Notice: Subject to any disclaimer, the term of this patent is extended or adjusted under 35 U.S.C. 154(b) by 231 days.

This patent is subject to a terminal disclaimer.

(21) Appl. No.: 17/349,223

(22) Filed: Jun. 16, 2021

(65) Prior Publication Data

US 2021/0309941 A1 Oct. 7, 2021

Related U.S. Application Data

(63) Continuation of application No. 16/500,492, filed as application No. PCT/US2018/026727 on Apr. 9, 2018.

(60) Provisional application No. 62/483,426, filed on Apr. 9, 2017.

(51) Int. Cl.

| | |
|---|---|
| ***C11D 3/38*** | (2006.01) |
| ***B08B 1/12*** | (2024.01) |
| ***B08B 1/14*** | (2024.01) |
| ***B08B 3/02*** | (2006.01) |
| ***B08B 3/04*** | (2006.01) |
| ***B08B 3/08*** | (2006.01) |
| ***B08B 9/027*** | (2006.01) |
| ***C11D 17/00*** | (2006.01) |

(52) U.S. Cl.
CPC ................ *C11D 3/381* (2013.01); *B08B 1/12* (2024.01); *B08B 1/143* (2024.01); *B08B 3/026* (2013.01); *B08B 3/04* (2013.01); *B08B 3/08* (2013.01); *B08B 9/027* (2013.01); *C11D 17/0043* (2013.01); *C11D 2111/20* (2024.01)

(58) Field of Classification Search
None
See application file for complete search history.

(56) References Cited

U.S. PATENT DOCUMENTS

| | | | | |
|---|---|---|---|---|
| 3,871,956 A | 3/1975 | Azarowics | | |
| 4,140,647 A | 2/1979 | Mizutani | | |
| 5,364,474 A | 11/1994 | Williford, Jr. | | |
| 6,033,901 A | 3/2000 | Powell, Jr. | | |
| 6,239,097 B1 * | 5/2001 | Wilson | C11D 1/75 | 510/108 |
| 7,556,654 B1 | 7/2009 | Nero | | |
| 9,441,115 B2 | 9/2016 | Wu et al. | | |
| 9,683,164 B2 | 6/2017 | Gunawan et al. | | |
| 9,884,986 B2 | 2/2018 | Gunawan et al. | | |
| 2001/0056047 A1 | 12/2001 | Meine et al. | | |
| 2002/0123077 A1 | 9/2002 | O'Toole et al. | | |
| 2004/0152613 A1 | 8/2004 | Develter et al. | | |
| 2004/0171512 A1 | 9/2004 | Furuta et al. | | |
| 2006/0080785 A1 | 4/2006 | Nero | | |
| 2006/0084587 A1 | 4/2006 | Nero | | |
| 2011/0180100 A1 * | 7/2011 | Hafer | C11D 1/825 | 510/435 |
| 2011/0237531 A1 | 9/2011 | Yanagisawa et al. | | |
| 2011/0274673 A1 | 11/2011 | Kang et al. | | |
| 2013/0324406 A1 | 12/2013 | Chisholm et al. | | |
| 2013/0331466 A1 | 12/2013 | Gross et al. | | |
| 2014/0273150 A1 | 9/2014 | Angel | | |
| 2014/0323757 A1 | 10/2014 | Kim | | |
| 2014/0360727 A1 | 12/2014 | Milam et al. | | |
| 2015/0037302 A1 | 2/2015 | Bralkowski et al. | | |
| 2015/0045290 A1 | 2/2015 | Coutte et al. | | |
| 2015/0141311 A1 | 5/2015 | Podella et al. | | |
| 2015/0259642 A1 | 9/2015 | Sangwai et al. | | |
| 2015/0300139 A1 | 10/2015 | Armstrong et al. | | |
| 2015/0344818 A1 * | 12/2015 | Barnabas | C11D 1/143 | 162/76 |
| 2016/0145487 A1 | 5/2016 | Alam et al. | | |
| 2016/0160111 A1 | 6/2016 | Smith et al. | | |
| 2016/0244347 A1 | 8/2016 | Angel | | |
| 2017/0051197 A1 * | 2/2017 | Duran | C09K 8/035 | |

(Continued)

FOREIGN PATENT DOCUMENTS

| | | |
|---|---|---|
| CN | 104109646 A | 10/2014 |
| CN | 104233331 A | 12/2014 |
| CN | 105567580 A | 5/2016 |

(Continued)

OTHER PUBLICATIONS

Walker, G.M., Pichia anomala: cell physiology and biotechnology relative to other yeasts., Aug. 14, 2010, Antonie van Leeuwenhoek 99, 25-34. https://doi.org/10.1007/s10482-010-9491-8.*
De Almeida, D., et al., "Biosurfactants: Promising Molecules for Petroleum Biotechnology Advances." Frontiers in Microbiology, Oct. 2016, 7(1718): 1-14.
De Brito, D., Biosurfactants from renewable raw materials, Universidade do Minho Departamento de Engenharia Biologica, Nov. 2013, pp. 1-93.
De Oliveira, M., et al., "Review: Sophorolipids A Promising Biosurfactant and it's Applications." International Journal of Advanced Biotechnology and Research, 2015, 6(2): 161-174.
Elshafie, A. E., et al., "Sophorolipids Production by Candida bombicola ATCC 22214 and its Potential Application in Microbial Enhanced Oil Recovery." Frontiers in Microbiology, Nov. 2015, 6(1324): 1-11.

(Continued)

*Primary Examiner* — Erin F Bergner
(74) *Attorney, Agent, or Firm* — SALIWANCHIK, LLOYD & EISENSCHENK

(57) ABSTRACT

The subject invention provides yeast-based products, as well as their use to improve industrial production and performance by, for example, efficiently cleaning contaminating and/or fouling substances such as FOG, biofilm, paraffin, and/or asphaltenes from industrial equipment.

16 Claims, No Drawings

(56) References Cited

U.S. PATENT DOCUMENTS

| | | | |
|---|---|---|---|
| 2019/0359562 A1 | 11/2019 | Lyman et al. |
| 2020/0199492 A1 | 6/2020 | Xue et al. |

FOREIGN PATENT DOCUMENTS

| | | | |
|---|---|---|---|
| CN | 105753283 A | 7/2016 |
| EP | 1990106 A1 | 11/2008 |
| EP | 3290501 A1 | 3/2018 |
| JP | 2012517508 A | 5/2012 |
| WO | 9807883 A1 | 2/1998 |
| WO | 2007129332 A1 | 11/2007 |
| WO | 2010091433 A1 | 8/2010 |
| WO | 2011008570 A2 | 1/2011 |
| WO | 2012010407 A1 | 1/2012 |
| WO | 2013110132 A1 | 8/2013 |
| WO | 2014152350 A1 | 9/2014 |
| WO | 2015093934 A1 | 6/2015 |
| WO | 2015153476 A1 | 10/2015 |
| WO | 2017044953 A1 | 3/2017 |
| WO | 2018049182 A2 | 3/2018 |
| WO | 2018107162 A1 | 6/2018 |

OTHER PUBLICATIONS

Kurtzman, C.P., et al., "Production of sophorolipid biosurfactants by multiple species of the Starmerella (Candida) bombicolayeast clade." FEMS Microbiol Lett, 2010, 311: 140-146.
Morikawa, M., "Beneficial Biofilm Formation by Industrial Bacteria Bacillus subtilis and Related Species." Journal of Bioscience and Bioengineering, 2006, 101(1): 1-8.
Pacwa-Plociniczak, M. et al., "Review: Environmental Applications of Biosurfactants: Recent Advances." Int. J. Mol. Sci., 2011, 12: 633-654.
Santos, D.K.F., et al., "Biosurfactants: Multifunctional Biomolecules of the 21st Century." International Journal of Molecular Sciences, 2016, 17(401): 1-31.
Sen, R., "Biosurfactants: Advances in Experimental Medicine and Biology." Landes Bioscience and Springer Science+Business Media, LLC, 2010, 672: 1-331.
Sharma, A. et al., "A study on biosurfactant production in Lactobacillus and *Bacillus* sp." Int. J. Curr. Microbiol. App. Sci., 2014, 3(11): 723-733.
Daverey, A., et al., "Production of sophorolipids by the yeast Candida bombicola using simple and low cost fermentative media." Food Research International, 2009, 42: 499-504.
Diaz De Rienzo, M.A., et al., "Sophorolipid biosurfactants: Possible uses as antibacterial and antibiofilm agent." New biotechnology, 2015, 32(6): 720-726.
Ines, M., et al., "Glycolipids biosurfactants; Potential related Biomedical and Biotechnical Applications." Carbohydrate Research, 2015, 416: 59-69.
Ma, X., et al., "Surface and biological activity of sophorolipid molecules produced by *Wickerhamiella domercqiae* var. sophorolipid CGMCC 1576." Journal of Colloid and Interface Science, 2012, 376: 165-172.
Satpute, S. K., et al., "Multiple Roles of Biosurfactants in Biofilms." Current Pharmaceutical Design, 2016, 22(11): 1429-1448.
Takahashi, M., et al., "Production of Sophorolipid Glycolipid Biosurfactants from Sugarcane Molasses Using Starmerella bombicola NBRC 10243." Journal of Oleo Science, 2011, 60(5): 267-2733.
Thaniyavarn, J., et al., "Production of Sophorolipid Biosurfactant by Pichia anomala." Bioscience, Biotechnology, and Biochemistry, 2008, 72(8): 2061-2068.
Wadekar, S., et al., "Sophorolipid Production by Starmerella bombicola (ATCC 22214) from Virgin and Waste Frying Oils, and the Effects of Activated Earth Treatment of the Waste Oils." J Am Oil Chem Soc, 2012, 89: 1029-1039.

* cited by examiner

MATERIALS AND METHODS FOR MAINTAINING INDUSTRIAL, MECHANICAL AND RESTAURANT EQUIPMENT

CROSS-REFERENCE TO RELATED APPLICATION

This application is a continuation of co-pending U.S. patent application Ser. No. 16/500,492, filed Oct. 3, 2019; which is a National Stage Application of International Application No. PCT/US2018/026727, filed Apr. 9, 2018; which claims the benefit of U.S. provisional patent application Ser. No. 62/483,426, filed Apr. 9, 2017, all of which are incorporated herein by reference in their entirety.

BACKGROUND OF THE INVENTION

Equipment used in restaurants and other industries come into contact with a variety of materials that can cause corrosion or lead to accumulation of undesirable contaminating substances. This can impede the operation of the equipment and otherwise interfere with production. Accumulation of contaminants on solid surfaces can lead to what is known as "fouling." Contaminants associated with fouling can be living organisms (i.e., biofouling) and/or non-living organic or inorganic substances.

Fouling affects nearly every industry, including, for example, chemical processing, oil and gas, pulp and paper, agriculture, aquaculture, general manufacturing, food processing and food service. Both metal and non-metal equipment surfaces can become contaminated with oils, greases, and other hydrophobic, organic, and/or inorganic contaminants.

Many manufacturing, food processing and industrial facilities, for example, dispose of liquid waste into sewer lines. The waste often contains fats, oils and grease (FOG) and other contaminants which, over time, leads to accumulation of contaminants and clogged pipes. Typically, addressing this problem involves cleaning pipes with caustic drain cleaners, mechanically routing the pipes or replacing the pipes completely.

Restaurants and slaughterhouses often employ the use of grease traps to mitigate this problem; however, even when grease-traps are included in a drainage system, a permanent, solid grease layer can form over the top of the water in the grease-trap, which then requires pumping out.

In other situations, liquid waste is disposed of into septic tanks and drain fields (or leach fields). Drain fields typically have a series of trenches with perforated pipes therein, and porous material, such as rocks or gravel filling the trenches. The gravel is covered by a layer of soil. When waste water is disposed of in a drain field, high concentrations of, for example, FOG in the waste water can lead to grease build-up on the rocks. Over time, this can lead to the formation of a seal, which prevents water from flowing into the drain field pipes. These issues are often resolved by digging out the drain field and replacing it with new materials.

In the oil and gas industry, a common cause of structural failure and production inefficiency is the formation of fouling deposits in and around the wellbore, tubing, flow lines, storage tanks, separators, tanker trucks, and other components of hydrocarbon production infrastructure. These problematic deposits are formed by, for example, high-molecular-weight constituents of petroleum fluids, most notably, paraffins, scales and asphaltenes. Once a thin layer of these deposits forms on a surface, the rate of further accumulation significantly increases. This can lead to, for example, complete blockage of hydrocarbon flow through tubes and pipes.

Furthermore, biofilms can build up in structures and processing mechanisms used in a variety of industries. A "biofilm" comprises layers of biomass made up of a compact grouping of microorganisms surrounded by an extracellular matrix of polymeric substances. Biofilms adhere to surfaces of many mechanisms, tanks, and conduits and can significantly impair their proper functioning. For example, biofilms can cause biofouling on the inner surfaces of tubes and pipes. Even in small amounts, biofilm can impede or even completely block these structures, thus reducing the available space for, e.g., water, oil, and/or gas circulation.

Accumulation of deposits can have a compounding effect. Unless the deposits are removed, operators can be faced with, for example, lowering production yields, improper function of equipment, high cleaning costs, environmental pollution, and potential for total loss of production. While certain mechanical, chemical, heat, and biological removal methods are known for cleaning fouling contaminants in many different industries, contaminating substances are nonetheless difficult and expensive to remove using most of these conventional cleaning products and methods.

Many aqueous industrial and household cleaners contain a mixture of enzymes and surfactants. The enzymes primarily serve to attack or degrade organic compounds, while the surfactants act to disperse the degraded particles in the aqueous phase. Other cleaning compositions have alkaline components, such as a caustic, an alkali, or an alkaline metal cation. These alkaline cleaners, however, are not always ideal, as these harsh chemicals can be hazardous pollutants when released into the environment. Furthermore, alkaline detergents can cause oils and fats to become solid, forming scum that can collect on the inside of sewage pipes and tanks.

A number of biological processes and compositions have been developed to remediate fouling issues as well, including the use of microorganisms or enzymes. Some of these compositions, however, have been found to be unstable and yield variable results from one batch to another. Other compositions are directed at only a specific contaminant and do not address the problems presented by waste containing high amounts of various other FOG or fouling substances. While each of the treatments has its own benefits, drawbacks often include cost, safety in processing, large-scale sustainability, and damage to the environment.

Non-toxic and non-polluting compositions are needed for emulsification and digestion of fats, oils, greases and other contaminants that, for example, clog pipes and drains, foul engines and other mechanical equipment, and build up in storage tanks and tankers.

Accordingly, there is a need for a more universal, powerful, and environmentally-friendly method of removing contaminants and other fouling substances that accumulate on equipment surfaces across a variety of manufacturing and service industries.

BRIEF SUMMARY OF THE INVENTION

The subject invention provides yeast-based products, as well as methods of their use, to maintain and/or improve production in a variety of industries by, for example, efficiently removing contaminating substances from equipment and equipment surfaces. Such contaminating substances can include, but are not limited to, fats, oils, greases, scale, paraffin, asphaltene, lipids, and/or biofilms.

In preferred embodiments, the subject invention provides materials and methods for cleaning industrial equipment using biochemical-producing yeasts and/or by-products of their growth, such as, for example, biosurfactants, solvents and/or enzymes. Advantageously, the yeast-based compositions and methods of the subject invention are environmentally-friendly, operationally-friendly and cost-effective.

In preferred embodiments, the subject invention provides a yeast-based cleaning composition for cleaning industrial equipment, wherein the cleaning composition comprises yeasts and/or their growth by-products. In one embodiment, the yeast is a biosurfactant-, solvent-, and/or enzyme-producing yeast, or a combination thereof.

In a certain specific embodiment, the yeast-based composition comprises the microbe Starmerella *bombicola* and/or growth by-products thereof. In one embodiment, the microbe is a "killer yeast" strain such as, for example, Wickerhamomyces *anomalus* (*Pichia anomala*), and/or its growth by-products.

In certain embodiments, the yeasts of the subject invention can be used in conjunction with other chemical and/or microbial treatments.

In certain embodiments, the cleaning compositions of the subject invention have advantages over, for example, biosurfactants, solvents and/or enzymes alone, including one or more of the following: high concentrations of mannoprotein as a part of a yeast cell wall's outer surface; the presence of beta-glucan in yeast cell walls; the presence of biosurfactants, other metabolites and/or solvents (e.g., proteolytic and lipolytic enzymes, ethanol, ethyl acetate, etc.) in the culture.

In one embodiment, the composition according to the subject invention is obtained through cultivation processes ranging from small to large scale. The cultivation process can be, for example, submerged cultivation, solid state fermentation (SSF), and/or a combination thereof.

In one embodiment, the subject invention provides a yeast fermentation product that can be used to clean contaminants or other fouling substances from industrial equipment. Preferably, the yeasts in the yeast fermentation product are deactivated prior to use of the product as a cleaning composition.

The yeast fermentation product can be obtained via cultivation of a biosurfactant-producing and/or metabolite-producing yeast, such as, for example, *Pichia anomala* (Wickerhamomyces *anomalus*) (referred to herein as "Star3+" treatment). The fermentation broth after 7 days of cultivation at 25-30° C. can contain the yeast cell suspension and, for example, 4 g/L or more of biosurfactant.

The yeast fermentation product can also be obtained via cultivation of a biosurfactant-producing and/or metabolite-producing yeast, such as, for example, Starmerella *bombicola* (referred to herein as "Star3" treatment). The fermentation broth after 5 days of cultivation at 25° ° C. can contain the yeast cell suspension and, for example, 150 g/L or more of biosurfactant.

In preferred embodiments, the subject invention provides efficient methods for cleaning industrial equipment by applying a composition comprising a biochemical-producing yeast and/or growth by-products thereof to the equipment.

In certain embodiments, the methods are used to clean a surface, wherein the surface is equipment in need of decontamination, defouling, and/or unclogging. Advantageously, the methods of the subject invention can be used to improve overall productivity of an industrial operation or a piece of mechanical equipment by improving the maintenance and proper functioning of equipment.

The yeast can be live (or viable), or inactive, at the time of application. In preferred embodiments, the yeasts are inactive. Deactivation of yeast can be performed by known methods, for example, using heat. In one embodiment, the method comprises applying a yeast-based composition of the subject invention, such as, for example, Star3+ or Star3, to the equipment.

The cleaning composition can be applied to the surface by spraying using, for example, a spray bottle or a pressurized spraying device. The cleaning composition can also be applied using a cloth or a brush, wherein the composition is rubbed, spread or brushed onto the surface. Furthermore, the cleaning composition can be applied to the surface by dipping, dunking or submerging the surface into a container having the cleaning composition therein.

In one embodiment, the surface is allowed to soak with the cleaning composition thereon for a sufficient time to remove the contaminant. For example, soaking can occur for 12 to 24 to 36 to 48 to 72 hours or more, as needed.

In one embodiment, the method further comprises the step of removing the cleaning composition and contaminant from the surface. This can be achieved by, for example, rinsing or spraying water onto the surface, and/or rubbing or wiping the surface with a cloth until the cleaning composition and contaminant have been freed from the surface. Rinsing or spraying with water can be performed before and/or after rubbing or wiping the surface with a cloth.

In another embodiment, mechanical methods can be used to remove the contaminant and/or cleaning composition from the surface. For example, an agitator, drill, hammer, or scraper can be used for freeing contaminants from surfaces that are particularly difficult to remove due to, for example, the amount of contaminant or the type of contaminant.

In certain embodiments, the subject invention provides methods for removing paraffin and/or liquefying solid asphaltene from the surfaces of industrial equipment, such as, for example, storage tanks, trucks, pipes and tubing used in oil and gas production. In such methods, the cleaning composition can be applied with solvents, such as, for example, isopropyl alcohol and/or ethanol.

In certain embodiments, the methods are used for cleaning lipids, fats, oils and greases (FOG) from the surfaces of industrial and mechanical equipment. For example, in some embodiments, the subject invention can be used to clean FOG and other contaminants from drains, pipes, tubes, automobiles and engines.

In certain embodiments, the subject invention can be used to unclog pieces of equipment in or on which contaminants have accumulated. For example, in one embodiment, the piece of equipment is a conduit, such as a drain, pipe or tube, that has been clogged completely or nearly completely by contaminants. In yet another embodiment, the industrial equipment is a clogged grease trap, such as those used in restaurants, kitchens, food processing factories or slaughterhouses.

In some embodiments, the present invention can be used to remove odors emitted from grease-traps, drains, septic tanks, discharge water (e.g., from industrial meat and poultry processing and packing plants), lift stations, and municipal systems.

In one embodiment, the subject invention provides methods of producing a biosurfactant by cultivating a yeast strain of the subject invention under conditions appropriate for growth and surfactant production; and, optionally, purifying the surfactant. The subject invention also provides methods of producing growth by-products such as, for example, enzymes, solvents, proteins and/or other metabolites by cultivating a yeast strain of the subject invention under conditions appropriate for growth and by-product expression; and optionally, purifying the growth by-product.

In certain embodiments, the biosurfactants can work synergistically with the solvents and other metabolites that are also produced by the yeasts.

In one embodiment, the yeasts of the subject microbe-based compositions can be grown at the site of treatment and produce the active compounds onsite. Consequently, a high concentration of, for example, biosurfactant and biosurfactant-producing yeasts at a treatment site (e.g., a restaurant) can be achieved easily and continuously.

The yeast-based products of the subject invention can be used in a variety of unique settings because of, for example, the ability to efficiently deliver fresh fermentation broth with active metabolites; a mixture of cells with fermentation broth; compositions with a high density of cells; yeast-based products on short-order; and yeast-based products in remote locations.

Advantageously, the present invention can be used without releasing large quantities of inorganic compounds into the environment. Additionally, the compositions and methods utilize components that are biodegradable and toxicologically safe. Thus, the present invention can be used in a variety of industries as a "green" treatment.

DETAILED DESCRIPTION

The subject invention provides yeast-based products, as well as methods of their use, to maintain and/or improve production in a variety of industries by, for example, efficiently removing contaminating substances from equipment and equipment surfaces. Such contaminating substances can include, but are not limited to, fats, oils, greases, scale, paraffin, asphaltene, lipids, and/or biofilms.

In preferred embodiments, the subject invention provides materials and methods for cleaning industrial equipment using biochemical-producing yeasts and/or by-products of their growth, such as, for example, biosurfactants, solvents and/or enzymes. Advantageously, the yeast-based compositions and methods of the subject invention are environmentally-friendly, operationally-friendly and cost-effective.

In preferred embodiments, the subject invention provides a yeast-based composition for cleaning industrial equipment, the composition comprising yeasts and/or their growth by-products. In one embodiment, the yeast is a biosurfactant-, solvent-, and/or enzyme-producing yeast.

In a certain specific embodiment, the yeast-based composition comprises Starmerella *bombicola* and/or growth by-products thereof. In one embodiment, the yeast is a "killer yeast" strain such as, for example, Wickerhamomyces *anomalus* (*Pichia anomala*), and/or its growth by-products.

In certain embodiments, the yeasts of the subject invention can be used in conjunction with other chemical and/or microbial treatments.

In preferred embodiments, the subject invention provides efficient methods for cleaning industrial equipment by applying a composition comprising a biochemical-producing yeast and/or growth by-products thereof to the equipment. In one embodiment, the method comprises applying a yeast-based composition of the subject invention to the equipment.

Selected Definitions

As used herein, reference to a "yeast-based composition" means a composition that comprises components that were produced as the result of the growth of yeasts or other cell cultures. Thus, the yeast-based composition may comprise the microbes themselves and/or by-products of microbial growth. The yeast may be in an active or inactive (deactivated) form. The yeasts may be planktonic or in a biofilm form, or a mixture of both. The by-products of growth may be, for example, metabolites (e.g., biosurfactants), cell membrane components, expressed proteins, and/or other cellular components. The yeasts may be intact or lysed. The cells may be absent, or present at, for example, a concentration of $1\times10^4$, $1\times10^5$, $1\times10^6$, $1\times10^7$, $1\times10^8$, $1\times10^9$, $1\times10^{10}$, or $1\times10^{11}$ or more cells per milliliter of the composition.

The subject invention further provides "yeast-based products," which are products that are to be applied in practice to achieve a desired result. The yeast-based product can be simply the yeast-based composition harvested from the yeast cultivation process. Alternatively, the yeast-based product may comprise further ingredients that have been added. These additional ingredients can include, for example, stabilizers, buffers, appropriate carriers, such as water, salt solutions, or any other appropriate carrier, and agents that facilitate tracking of the microbes and/or the composition in the environment to which it is applied. The yeast-based product may also comprise mixtures of yeast-based compositions. The yeast-based product may also comprise one or more components of a yeast-based composition that have been processed in some way such as, but not limited to, filtering, centrifugation, lysing, drying, purification and the like.

As used herein, a "biofilm" is a complex aggregate of microorganisms, such as bacteria, yeast, or fungi, wherein the cells adhere to each other on a surface. The cells in biofilms are physiologically distinct from planktonic cells of the same organism, which are single cells that can float or swim in liquid medium.

As used herein, "contaminant" refers to any substance that causes another substance or object to become fouled or impure. Contaminants can be living or non-living and can be inorganic or organic substances or deposits. Furthermore, contaminants can include, but are not limited to, hydrocarbons, such as petroleum or asphaltenes; fats, oils and greases (FOG), such as cooking grease, plant-based oils, and lard; lipids; waxes, such as paraffin; resins; biofilms; or any other substances referred to as, for example, dirt, dust, scale, sludge, crud, slag, grime, scum, plaque, buildup, or residue.

As used herein, "fouling" means the accumulation or deposition of contaminants on a surface of a piece of equipment in such a way as to compromise the structural and/or functional integrity of the equipment. Fouling can cause clogging, plugging, deterioration, corrosion, and other problems associated therewith, and can occur on or in both metallic and non-metallic structures and equipment. Fouling that occurs as a result of living organisms, for example, biofilms, is referred to as "biofouling."

As used herein, "cleaning" as used in the context of contaminants or fouling means removal or reduction of contaminants from a surface or a piece of equipment. Cleaning can include purifying, defouling, decontaminating, clearing or unclogging, and can be achieved by any means, including but not limited to, melting, emulsifying, dissolving, scraping, degrading, blasting, soaking, or cleaving the contaminant. Cleaning can further include controlling, inhibiting or preventing further fouling or contamination from occurring.

A "metabolite" refers to any substance produced by metabolism or a substance necessary for taking part in a particular metabolic process. A metabolite can be an organic compound that is a starting material (e.g., glucose), an intermediate (e.g., acetyl-CoA) in, or an end product (e.g., n-butanol) of metabolism. Examples of metabolites can include, but are not limited to, enzymes, toxins, acids, solvents, alcohols, proteins, carbohydrates, vitamins, minerals, microelements, amino acids, polymers, and surfactants.

As used herein, "surfactant" means a compound that lowers the surface tension (or interfacial tension) between two liquids or between a liquid and a solid. Surfactants act as detergents, wetting agents, emulsifiers, foaming agents, and/or dispersants. By "biosurfactant" is meant a surface-active substance produced by a living cell.

As used herein, an "isolated" or "purified" nucleic acid molecule, polynucleotide, polypeptide, protein or organic compound, such as a small molecule, is substantially free of other compounds, such as cellular material, with which it is associated in nature. As used herein, reference to an "isolated" strain means that the strain is removed from the environment in which it exists in nature. Thus, the isolated strain may exist as, for example, a biologically pure culture, or as spores (or other forms of the strain) in association with an agricultural carrier.

In certain embodiments, purified compounds are at least 60% by weight the compound of interest. Preferably, the preparation is at least 75%, more preferably at least 90%, and most preferably at least 99%, by weight the compound of interest. For example, a purified compound is one that is at least 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis. A purified or isolated polynucleotide (ribonucleic acid (RNA) or deoxyribonucleic acid (DNA)) is free of the genes or sequences that flank it in its naturally-occurring state. A purified or isolated polypeptide is free of other molecules, or the amino acids that flank it, in its naturally-occurring state.

Ranges provided herein are understood to be shorthand for all of the values within the range. For example, a range of 1 to 20 is understood to include any number, combination of numbers, or sub-range from the group consisting 1, 2, 3, 4, 5, 6, 7, 8, 9, 10, 11, 12, 13, 14, 15, 16, 17, 18, 19 and 20, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

As used herein, "reduces" means a negative alteration of at least 1%, 5%, 10%, 25%, 50%, 75%, or 100%.

As used herein, "reference" means a standard or control condition.

As used herein, "salt-tolerant" means a microbe capable of growing in a sodium chloride concentration of fifteen (15) percent or greater. In a specific embodiment, "salt-tolerant" refers to the ability to grow in 150 g/L or more of NaCl.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

Unless specifically stated or obvious from context, as used herein, the term "or" is understood to be inclusive. Unless specifically stated or obvious from context, as used herein, the terms "a," "an" and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof. All references cited herein are hereby incorporated by reference.

Yeast Strains According to the Subject Invention

The subject invention utilizes biochemical-producing yeasts. The yeasts may be natural, or genetically modified microorganisms. For example, the yeasts may be transformed with specific genes to exhibit specific characteristics. The yeasts may also be mutants of a desired strain. As used herein, "mutant" means a strain, genetic variant or subtype of a reference microorganism, wherein the mutant has one or more genetic variations (e.g., a point mutation, missense mutation, nonsense mutation, deletion, duplication, frame-shift mutation or repeat expansion) as compared to the reference microorganism. Procedures for making mutants are well known in the microbiological art. For example, UV mutagenesis and nitrosoguanidine are used extensively toward this end.

Yeast (and fungus) species suitable for use according to the current invention, include *Candida, Saccharomyces* (*S. cerevisiae, S. boulardii* sequela, S. torula), Issatchenkia, *Kluyveromyces, Pichia*, Wickerhamomyces (e.g., W. *anomalus*), Starmerella (e.g., S. *bombicola*), Mycorrhiza, *Mortierella*, Phycomyces, Blakeslea, Thraustochytrium, Phythium, *Entomophthora, Aureobasidium pullulans, Pseudozyma aphidis, Aspergillus, Trichoderma* (e.g., *T. reesei. T. harzianum, T. hamatum, T. viride*), and/or *Rhizopus* spp.

In one embodiment, the yeast is a killer yeast. As used herein, "killer yeast" means a strain of yeast characterized by its secretion of toxic proteins or glycoproteins, to which the strain itself is immune. The exotoxins secreted by killer yeasts are capable of killing other strains of yeast, fungi, or bacteria. For example, microorganisms that can be controlled by killer yeast include *Fusarium* and other filamentous fungi. Examples of killer yeasts according to the present invention are those that can be used safely in the food and fermentation industries, e.g., beer, wine, and bread making; those that can be used to control other microorganisms that might contaminate such production processes; those that can be used in biocontrol for food preservation; those than can be used for treatment of fungal infections in both humans and plants; and those that can be used in recombinant DNA technology. Such yeasts can include, but are not limited to, Wickerhamomyces (e.g., W. *anomalus*), *Pichia* (e.g., *P. anomala, P. guielliermondii, P. occidentalis*, P. kudriavzevii), *Hansenula, Saccharomyces*, Hanseniaspora, (e.g., H. *uvarum*), *Ustilago maydis, Debaryomyces hansenii, Can-*

*dida, Cryptococcus, Kluyveromyces, Torulopsis, Ustilago, Williopsis, Zygosaccharomyces* (e.g., *Z. bailii*), and others.

Other microbial strains including, for example, other fungal strains capable of accumulating significant amounts of, for example, glycolipid-biosurfactants or other useful metabolites can be used in accordance with the subject invention. Other metabolites useful according to the present invention include mannoprotein, beta-glucan and others that have bio-emulsifying and surface/interfacial tension-reducing properties.

Growth of Yeasts According to the Subject Invention

The subject invention provides methods for cultivation of yeasts and production of microbial metabolites and/or other by-products of microbial growth. The microbial cultivation systems would typically use submerged culture fermentation; however, surface culture and hybrid systems can also be used. As used herein "fermentation" refers to growth of cells under controlled conditions. The growth could be aerobic or anaerobic.

In one embodiment, the subject invention provides materials and methods for the production of biomass (e.g., viable cellular material), extracellular metabolites (e.g. small molecules and excreted proteins), residual nutrients and/or intracellular components (e.g. enzymes and other proteins).

The microbe growth vessel used according to the subject invention can be any fermenter or cultivation reactor for industrial use. In one embodiment, the vessel may have functional controls/sensors or may be connected to functional controls/sensors to measure important factors in the cultivation process, such as pH, oxygen, pressure, temperature, agitator shaft power, humidity, viscosity and/or microbial density and/or metabolite concentration.

In a further embodiment, the vessel may also be able to monitor the growth of microorganisms inside the vessel (e.g., measurement of cell number and growth phases). Alternatively, a daily sample may be taken from the vessel and subjected to enumeration by techniques known in the art, such as dilution plating technique. Dilution plating is a simple technique used to estimate the number of microbes in a sample. The technique can also provide an index by which different environments or treatments can be compared.

In one embodiment, the method includes supplementing the cultivation with a nitrogen source. The nitrogen source can be, for example, potassium nitrate, ammonium nitrate ammonium sulfate, ammonium phosphate, ammonia, urea, and/or ammonium chloride. These nitrogen sources may be used independently or in a combination of two or more.

The method can provide oxygenation to the growing culture. One embodiment utilizes slow motion of air to remove low-oxygen containing air and introduce oxygenated air. The oxygenated air may be ambient air supplemented daily through mechanisms including impellers for mechanical agitation of the liquid, and air spargers for supplying bubbles of gas to the liquid for dissolution of oxygen into the liquid.

The method can further comprise supplementing the cultivation with a carbon source. The carbon source is typically a carbohydrate, such as glucose, sucrose, lactose, fructose, trehalose, mannose, mannitol, and/or maltose; organic acids such as acetic acid, fumaric acid, citric acid, propionic acid, malic acid, malonic acid, and/or pyruvic acid; alcohols such as ethanol, propanol, butanol, pentanol, hexanol, isobutanol, and/or glycerol; fats and oils such as soybean oil, rice bran oil, canola oil, coconut oil, olive oil, corn oil, sesame oil, and/or linseed oil; etc. These carbon sources may be used independently or in a combination of two or more.

In one embodiment, growth factors and trace nutrients for microorganisms are included in the medium. This is particularly preferred when growing microbes that are incapable of producing all of the vitamins they require. Inorganic nutrients, including trace elements such as iron, zinc, copper, manganese, molybdenum and/or cobalt may also be included in the medium. Furthermore, sources of vitamins, essential amino acids, and microelements can be included, for example, in the form of flours or meals, such as corn flour, or in the form of extracts, such as yeast extract, potato extract, beef extract, soybean extract, banana peel extract, and the like, or in purified forms. Amino acids such as, for example, those useful for biosynthesis of proteins, can also be included, e.g., L-Alanine.

In one embodiment, inorganic salts may also be included. Usable inorganic salts can be potassium dihydrogen phosphate, dipotassium hydrogen phosphate, disodium hydrogen phosphate, magnesium sulfate, magnesium chloride, iron sulfate, iron chloride, manganese sulfate, manganese chloride, zinc sulfate, lead chloride, copper sulfate, calcium chloride, calcium carbonate, and/or sodium carbonate. These inorganic salts may be used independently or in a combination of two or more.

In some embodiments, the method for cultivation may further comprise adding additional acids and/or antimicrobials in the liquid medium before and/or during the cultivation process. Antimicrobial agents or antibiotics are used for protecting the culture against contamination. Additionally, antifoaming agents may also be added to prevent the formation and/or accumulation of foam when gas is produced during cultivation.

The pH of the mixture should be suitable for the microorganism of interest. Buffers, and pH regulators, such as carbonates and phosphates, may be used to stabilize pH near a preferred value. When metal ions are present in high concentrations, use of a chelating agent in the liquid medium may be necessary.

The method and equipment for cultivation of microorganisms and production of the microbial by-products can be performed in a batch, quasi-continuous, or continuous processes.

In one embodiment, the method for cultivation of microorganisms is carried out at about 5° to about 100° C., preferably, 15 to 60° C., more preferably, 25 to 50° C. In a further embodiment, the cultivation may be carried out continuously at a constant temperature. In another embodiment, the cultivation may be subject to changing temperatures.

In one embodiment, the equipment used in the method and cultivation process is sterile. The cultivation equipment such as the reactor/vessel may be separated from, but connected to, a sterilizing unit, e.g., an autoclave. The cultivation equipment may also have a sterilizing unit that sterilizes in situ before starting the inoculation. Air can be sterilized by methods know in the art. For example, the ambient air can pass through at least one filter before being introduced into the vessel. In other embodiments, the medium may be pasteurized or, optionally, no heat at all added, where the use of low water activity and low pH may be exploited to control bacterial growth.

In one embodiment, the subject invention further provides a method for producing microbial metabolites such as ethanol, lactic acid, beta-glucan, proteins, peptides, metabolic intermediates, polyunsaturated fatty acid, and lipids. The metabolite content produced by the method can be, for example, at least 20%, 30%, 40%, 50%, 60%, 70%, 80%, or 90%.

The biomass content of the fermentation broth may be, for example from 5 g/l to 180 g/l or more. In one embodiment, the solids content of the broth is from 10 g/l to 150 g/l.

The microbial growth by-product produced by microorganisms of interest may be retained in the microorganisms or secreted into the liquid medium. In another embodiment, the method for producing microbial growth by-product may further comprise steps of concentrating and purifying the microbial growth by-product of interest. In a further embodiment, the liquid medium may contain compounds that stabilize the activity of microbial growth by-product.

In preferred embodiments, the microbial growth by-product is a biosurfactant. Specific biosurfactants according to the subject invention include, for example, low-molecular-weight glycolipids (GLs), lipopeptides (LPs), flavolipids (FLs), phospholipids, and high-molecular-weight polymers such as lipoproteins, lipopolysaccharide-protein complexes, and polysaccharide-protein-fatty acid complexes.

In one embodiment, the microbial biosurfactant is a glycolipid such as a rhamnolipid (RLP), sophorolipid (SLP), trehalose lipid or mannosylerythritol lipid (MEL). In one embodiment, the microbial biosurfactant is a lipopeptide, such as an iturin, a fengycin or a surfactin.

In one embodiment, the yeast-based composition comprises a blend of any of these biosurfactants. Preferably the blend comprises sophorolipids, and optionally one or both of a mannosylerythritol lipid, a surfactin, an iturin and/or a rhamnolipid.

In one embodiment, all of the microbial cultivation composition is removed upon the completion of the cultivation (e.g., upon, for example, achieving a desired cell density, or density of a specified metabolite in the broth). In this batch procedure, an entirely new batch is initiated upon harvesting of the first batch.

In another embodiment, only a portion of the fermentation product is removed at any one time. In this embodiment, biomass with viable cells remains in the vessel as an inoculant for a new cultivation batch. The composition that is removed can be a cell-free broth or contain cells.

In this manner, a quasi-continuous system is created.

Advantageously, the method does not require complicated equipment or high energy consumption. The microorganisms of interest can be cultivated at small or large scale on site and utilized, even being still-mixed with their media. Similarly, the microbial metabolites can also be produced at large quantities at the site of need.

Advantageously, the yeast-based products can be produced in remote locations. The microbe growth facilities may operate off the grid by utilizing, for example, solar, wind and/or hydroelectric power.

Preparation of Yeast-based Products

One yeast-based product of the subject invention is simply the fermentation broth containing the yeast and/or the microbial metabolites produced by the yeast and/or any residual nutrients. The product of fermentation may be used directly without extraction or purification. If desired, extraction and purification can be easily achieved using standard extraction and/or purification methods or techniques described in the literature.

The yeasts in the yeast-based product may be in an active or inactive form. Preferably, the yeasts are inactive. The yeast-based products may be used without further stabilization, preservation, and storage. Advantageously, direct usage of these yeast-based products preserves a high viability of the microorganisms, reduces the possibility of contamination from foreign agents and undesirable microorganisms, and maintains the activity of the by-products of microbial growth.

In one embodiment, a yeast fermentation product can be obtained via cultivation of a biochemical-producing yeast, such as, for example, *Pichia anomala* (Wickerhamomyces *anomalus*). Wickerhamomyces *anomalus* is frequently associated with food and grain production and is an effective producer of various solvents, enzymes, toxins, as well as glycolipid biosurfactants, such as SLP. The fermentation broth after 7 days of cultivation at 25-30° C. can contain the yeast cell suspension and, for example, 4 g/L or more of glycolipid biosurfactants.

In one embodiment, the yeast fermentation product can also be obtained via cultivation of the biosurfactant-producing yeast, Starmerella *bombicola*. This species is an effective producer of glycolipid biosurfactants, such as SLP. The fermentation broth after 5 days of cultivation at 25° C. can contain the yeast cell suspension and, for example, 150 g/L or more of glycolipid biosurfactants.

The yeast and/or broth resulting from the yeast growth can be removed from the growth vessel and transferred via, for example, piping for immediate use.

The yeast fermentation product can comprise yeast cells and fermentation broth, or it can comprise the fermentation broth separated from the yeast cells. In one embodiment, the biosurfactants or other growth by-products in the broth are further separated from the broth and purified.

In other embodiments, the composition (yeast, broth, or yeast and broth) can be placed in containers of appropriate size, taking into consideration, for example, the intended use, the contemplated method of application, the size of the fermentation tank, and any mode of transportation from microbe growth facility to the location of use. Thus, the containers into which the yeast-based composition is placed may be, for example, from 1 gallon to 1,000 gallons or more. In other embodiments the containers are 2 gallons, 5 gallons, 25 gallons, or larger.

In certain embodiments, the compositions of the subject invention have advantages over, for example, biosurfactants alone, including one or more of the following: high concentrations of mannoprotein as a part of yeast cell wall's outer surface (mannoprotein is a highly effective bioemulsifier); the presence of biopolymer beta-glucan (an emulsifier) in yeast cell walls; and the presence of biosurfactants, metabolites and solvents (e.g., lactic acid, ethanol, ethyl acetate. etc.) in the culture.

Other biosurfactants and solvents that are useful according to the present invention include mannoprotein, beta-glucan, ethanol, lactic acid and other metabolites that have, for example, bio-emulsifying and surface/interfacial tension-reducing properties.

Upon harvesting the yeast-based composition from the growth vessels, further components can be added as the harvested product is placed into containers and/or piped (or otherwise transported for use). The additives can be, for example, buffers, carriers, other microbe-based compositions produced at the same or different facility, viscosity modifiers, preservatives, tracking agents, chelating agents (e.g., EDTA, sodium citrate, citric acid), solvents (e.g., isopropyl alcohol, ethanol), biocides, other microbes and other ingredients specific for an intended use.

Up to, for example, 50 wt. % or more of additives may be added, as needed, for particular applications, such as to vary the VOC levels, increase penetration of the mixture, decrease viscosity of the mixture, as couplers for solvent insolubles in the mixture, and to provide solvents for oleophilic and hydrophilic substances.

Other suitable additives, which may be contained in the formulations according to the invention, include substances that are customarily used for such preparations. Example of such additives include surfactants, emulsifying agents, lubricants, buffering agents, solubility controlling agents, pH adjusting agents, preservatives, stabilizers and ultra-violet light resistant agents.

In one embodiment, the yeast-based product may further comprise buffering agents including organic and amino acids or their salts. Suitable buffers include citrate, gluconate, tartarate, malate, acetate, lactate, oxalate, aspartate, malonate, glucoheptonate, pyruvate, galactarate, glucarate, tartronate, glutamate, glycine, lysine, glutamine, methionine, cysteine, arginine and a mixture thereof. Phosphoric and phosphorous acids or their salts may also be used. Synthetic buffers are suitable to be used but it is preferable to use natural buffers such as organic and amino acids or their salts listed above.

In a further embodiment, pH adjusting agents include potassium hydroxide, ammonium hydroxide, Potassium carbonate or bicarbonate, hydrochloric acid, nitric acid, sulfuric acid or a mixture.

In one embodiment, additional components such as an aqueous preparation of a salt as polyprotic acid such as sodium bicarbonate or carbonate, sodium sulfate, sodium phosphate, sodium biphosphate, can be included in the formulation.

The yeast-based product may be applied with a composition that promotes adherence of the yeast-based product to a surface to be treated. The adherence-promoting substance may be a component of the yeast-based product or it may be applied simultaneously with, or sequentially with, the yeast-based product.

Other suitable additives include terpenes, terpene alcohols, C8-C14 alcohol ester blends, glycols, glycol ethers, acid esters, diacid esters, petroleum hydrocarbons, amino acids, alkanolamines, and amines, preferably, methyl or isobutyl esters of C4-C6 aliphatic dibasic esters and n-methyl-2 pyrolidone.

Examples of terpenes include d-limonene and .alpha. and .beta. pinene and terpene alcohols, including a terpineol. C8-C14 alcohol ester blends include EXXATE 900, 1000, 1200 from Exxon Chemical; glycols include propylene glycol, dipropylene glycol, and triproplylene glycol; and glycol ethers include dipropylene glycol monomethyl ether, propylene glycol monomethyl ether, propylene glycol-n-butyl ether, ethylene glycol monobutyl ether, and diethylene glycol monobutyl ether. Acid esters include methyl oleate and methyl linoleate, and diacid esters include methyl or butyl diesters of glutaric, adipic, and succinic acids. Petroleum hydrocarbons include AROMATIC 100, AROMATIC 150 ISOPAR M, and ISOPAR K.

Amines such as morpholine; 1,3-dimethyl-2-imidazolidinone; 1, 3-propanediamine; 2-amino-1,3-propanediol; and 3-amino propanol; as well as alkanolamines such as triethanolamine, diethanolamine, 2-aminomethyl propanol, and monoethanolamine act as dispersants for contaminants and solubilize fatty acids and oils. Amino acids, provide non-toxic alternatives to monoethanolamine, and act as metal chelators. Methyl or isobutylesters of C4-C6 aliphatic dibasic esters and n-methyl-2 pyrolidone are also useful.

Other additives typically used in cleaning compositions may be used, including water softening agents, sequesterants, corrosion inhibitors, and antioxidants, which are added in amounts effective to perform their intended function. These additives and amounts thereof are well within the skill of the art. Suitable water softening agents include linear phosphates, styrene-maleic acid co-polymers, and polyacrylates. Suitable sequesterants include 1,3-dimethyl-2-immidazolidinone; 1-phenyl-3-isoheptyl-1,3-propanedione; and 2 hydroxy-5-nonylacetophenoneoxime. Examples of corrosion inhibitors include 2-aminomethyl propanol, diethylethanolamine benzotraizole, and methyl benzotriazole. Antioxidants suitable for the present invention include (BHT) 2,6-di-tert-butyl-para-cresol, (BHA) 2,6-di-tert-butyl-para-anisole, Eastman inhibitor O A BM-oxalyl bis (benzylidene-hydrazide), and Eastman DTBMA 2,5-di-tert-butylhydroquinone.

All additives should have a flash point greater than 100° F., preferably greater than 150° F. and more preferably 195° F. TCC in order to achieve a final product flash point greater than 200° F.

Advantageously, in accordance with the subject invention, the yeast-based product may comprise broth in which the microbes were grown. The product may be, for example, at least, by weight, 1%, 5%, 10%, 25%, 50%, 75%, or 100% broth. The amount of biomass in the product, by weight, may be, for example, anywhere from 0% to 100% inclusive of all percentages therebetween.

Optionally, the product can be stored prior to use. The storage time is preferably short. Thus, the storage time may be less than 60 days, 45 days, 30 days, 20 days, 15 days, 10 days, 7 days, 5 days, 3 days, 2 days, 1 day, or 12 hours. In a preferred embodiment, if live cells are present in the product, the product is stored at a cool temperature such as, for example, less than 20° C., 15° C., 10° C., or 5° C. On the other hand, a biosurfactant composition can typically be stored at ambient temperatures.

Local Production of Yeast-Based Products

In certain embodiments of the subject invention, a microbe growth facility produces fresh, high-density yeasts and/or yeast growth by-products of interest on a desired scale. The microbe growth facility may be located at or near the site of application. The facility produces high-density yeast-based compositions in batch, quasi-continuous, or continuous cultivation.

The microbe growth facilities of the subject invention can be located at the location where the yeast-based product will be used (e.g., a restaurant or factory). For example, the microbe growth facility may be less than 300, 250, 200, 150, 100, 75, 50, 25, 15, 10, 5, 3, or 1 mile from the location of use.

Because the yeast-based product is generated locally, on-site or near the site of application, without resort to the microorganism stabilization, preservation, storage and transportation processes of conventional microbial production, a much higher density of live or inactive yeasts can be generated. Thus, a smaller volume of the yeast-based product is required for use in the on-site application. Furthermore, this allows for higher density yeast applications where necessary to achieve the desired efficacy.

Advantageously, this allows for a scaled-down bioreactor (e.g., smaller fermentation tank, and smaller supplies of starter material, nutrients, pH control agents, and de-foaming agents, etc.), which makes the system efficient and facilitates the portability of the product. Local generation of the yeast-based product also facilitates the inclusion of the growth broth in the product, thus eliminating the requirement for stabilizing cells or separating them from their culture broth. The broth can contain agents produced during the fermentation that are particularly well-suited for local use.

Locally-produced high density, robust cultures of yeasts are more effective in the field than those that have undergone cell stabilization or have been sitting in the supply chain for some time. The yeast-based products of the subject invention are particularly advantageous compared to traditional products wherein cells have been separated from metabolites and nutrients present in the fermentation growth media. Reduced transportation times allow for the production and delivery of fresh batches of yeasts and/or their metabolites at the time and volume as required by local demand.

Advantageously, these microbe growth facilities provide a solution to the current problem of relying on far-flung industrial-sized producers whose product quality suffers due to upstream processing delays, supply chain bottlenecks, improper storage, and other contingencies that inhibit the timely delivery and application of, for example, a viable, high cell-count product and the associated broth and metabolites in which the cells are originally grown.

The microbe growth facilities provide manufacturing versatility by the ability to tailor the yeast-based products to improve synergies with destination geographies. Advantageously, in preferred embodiments, the systems of the subject invention harness the power of naturally-occurring local microorganisms and their metabolic by-products to improve cleaning capabilities. Local yeasts can be identified based on, for example, salt tolerance, or ability to grow at high temperatures.

The cultivation time for the individual vessels may be, for example, from 1 to 7 days or longer. The cultivation product can be harvested in any of a number of different ways.

Local production and delivery within, for example, 24 hours of fermentation results in pure, high cell density compositions and substantially lower shipping costs. Given the prospects for rapid advancement in the development of more effective and powerful microbial inoculants, consumers will benefit greatly from this ability to rapidly deliver microbe-based products.

Use of Yeast-Based Products in Equipment Maintenance and Cleaning

In preferred embodiments, the subject invention provides materials and methods for cleaning industrial equipment using biochemical-producing yeasts and/or by-products of their growth, such as, for example, biosurfactants, solvents and/or enzymes. Advantageously, the yeast-based compositions and methods of the subject invention are environmentally-friendly, operationally-friendly and cost-effective.

In preferred embodiments, the subject invention provides a yeast-based cleaning composition for cleaning industrial equipment, wherein the cleaning composition comprises yeasts and/or their growth by-products. In one embodiment, the yeast is a biosurfactant-, solvent-, and/or enzyme-producing yeast, or a combination thereof.

In a certain specific embodiment, the yeast-based composition comprises Starmerella *bombicola* and/or growth by-products thereof. In one embodiment, the yeast is a "killer yeast" strain such as, for example, Wickerhamomyces *anomalus* (*Pichia anomala*).

In certain embodiments, the cleaning compositions of the subject invention have advantages over, for example, biosurfactants, solvents and/or enzymes alone, including one or more of the following: high concentrations of mannoprotein as a part of a yeast cell wall's outer surface; the presence of beta-glucan in yeast cell walls; the presence of biosurfactants, other metabolites and/or solvents (e.g., proteolytic and lipolytic enzymes, ethanol, ethyl acetate, etc.) in the culture.

In preferred embodiments, the subject invention provides efficient methods for cleaning industrial equipment by applying a composition comprising a biochemical-producing yeast and/or growth by-products thereof to the equipment. The yeast can be live (or viable), or inactive, at the time of application. In preferred embodiments, the yeasts are inactive.

In one embodiment, the yeasts are applied with the broth resulting from fermentation of the yeast, which can comprise the growth by-product. In one embodiment, the growth by-product is applied with the yeast in a purified form. In one embodiment, the method comprises applying a yeast-based composition of the subject invention, such as, for example, Star3+ or Star3, to the equipment.

In certain embodiments, the methods are used to clean a surface, wherein the surface is equipment in need of decontamination, defouling, and/or unclogging. Advantageously, the methods of the subject invention can be used to improve overall productivity of an industrial operation or a piece of mechanical equipment by ensuring the maintenance and proper functioning of equipment.

As used herein, an "industry" refers to the production of particular goods or services for economic or societal benefit. The methods of the subject invention can be used to clean equipment from any number of industries, including, but not limited to, chemical processing, oil and gas, mining, pulp and paper, automotive production and repair, road construction, agriculture, aquaculture, waste and water treatment, general manufacturing, food processing (e.g., slaughterhouses, food and beverage factories) and food service (e.g., restaurants, bars, hotels, dining services).

As used herein, "industrial equipment" includes any equipment, machinery, tool, mechanism, structure, or surface, or any part thereof, whether naturally occurring or man-made, simple or complex, used in any of the processes involved in an industry. Non-limiting examples of industrial equipment include heavy machines or vehicles, hardware, factory machinery, assembly line parts, drills, tanks, sinks, tubes, pipes, drains, traps, pools or containers, as well as other surfaces, such as counters, floors, ceilings, walls and the like.

As used herein, "applying" a composition or product refers to contacting it with a target or site such that the composition or product can have an effect on that target or site. The effect can be due to, for example, microbial growth and/or the action of a biosurfactant, solvent, enzyme or other growth by-product. For example, the target contaminated equipment may be dipped, submerged, dunked and/or soaked in the yeast-based compositions. The compositions also may be injected, dispersed, dispensed, poured, spread, sprayed, rubbed, wiped, brushed or applied to the equipment by any other means contemplated by the ordinary skilled artisan.

In one embodiment, the method can further comprise adding various additives, such as solvents, with the cleaning composition. In one embodiment, the solvent is isopropyl alcohol, ethanol or ethyl acetate.

In one embodiment, the method can further comprise adding a chelating agent with the cleaning composition. As used herein, "chelator" or "chelating agent" means an active agent capable of removing a metal ion from a system by forming a complex so that the metal ion, for example, cannot readily participate in or catalyze oxygen radical formation.

Examples of chelating agents suitable for the present invention include, but are not limited to, dimercaptosuccinic acid (DMSA), 2,3-dimercaptopropanesulfonic acid (DMPS), alpha lipoic acid (ALA), thiamine tetrahydrofurfuryl disulfide (TTFD), penicillamine, ethylenediaminetetraacetic acid (EDTA), sodium acetate, sodium citrate and citric acid.

In preferred embodiments, the chelating agent is sodium citrate, citric acid, EDTA or a combination thereof.

The cleaning composition can be applied to the surface by spraying using, for example, a spray bottle or a pressurized spraying device. The cleaning composition can also be applied using a cloth or a brush, wherein the composition is rubbed, spread or brushed onto the surface. Furthermore, the cleaning composition can be applied to the surface by dipping, dunking or submerging the surface into a container having the cleaning composition therein.

In one embodiment, the surface is allowed to soak with the cleaning composition thereon for a sufficient time to remove the contaminant. For example, soaking can occur for 12 to 24 to 36 to 48 to 72 hours or more, as needed.

In one embodiment, the method further comprises the step of removing the cleaning composition and contaminant from the surface. This can be achieved by, for example, rinsing or spraying water onto the surface, and/or rubbing or wiping the surface with a cloth until the cleaning composition and contaminant have been freed from the surface. Rinsing or spraying with water can be performed before and/or after rubbing or wiping the surface with a cloth.

In another embodiment, mechanical methods can be used to remove the contaminant and/or cleaning composition from the surface. For example, an agitator, drill, hammer, or scraper can be used for freeing contaminants from surfaces that are particularly difficult to remove due to, for example, the amount of contaminant or the type of contaminant.

The yeast-based cleaning compositions used according to the subject method can contain ingredients in amounts effective to clean the equipment and/or to provide an effective coating on their surfaces to prevent future buildup of contaminants and the effects thereof. The removal of contaminants and the coating of the surfaces of equipment can be achieved together. That is, the equipment may be cleaned and treated simultaneously. In certain embodiments, the compositions contain ingredients in amounts effective to clean the equipment and/or to provide an effective treatment to inhibit solid buildups.

In certain embodiments, the subject invention provides methods for removing paraffin and/or liquefying solid asphaltene from the surfaces of industrial equipment, such as, for example, storage tanks, trucks, pipes and tubing used in oil and gas production and/or refining. Advantageously, the subject methods can be used to improve oil production through cleaning and maintenance of these surfaces and pieces of equipment that are involved in oil and/or gas production, transportation, storage and/or refining.

The oil and gas processing equipment that can be cleaned and decontaminated according to the subject invention includes all types and varieties of equipment associated with oil and gas recovery and processing, for example, well casings, pumps, rods, pipes, lines, tanks, and the like. It is contemplated that the present composition may be used with all such equipment.

There are multiple ways that the method of removing or preventing soils, sludge and/or scale buildup in gas and oil wells and equipment may be implemented using a composition in accordance with the present invention.

In addition to cleaning the wells and associated equipment, it is often desirable to introduce the composition, through perforations in the casing, into the surrounding formation. The composition may be forced into the surrounding formation by applied pressure or, if the composition is allowed to set at the bottom of the casing, the composition may seep into the formation without additional pressure. The composition permeates the formation, dissolving blockages in the formation to provide more efficient oil and gas recovery.

The composition may also be applied directly to equipment. For example, prior to placing rods and casings into gas and/or oil wells, these parts may be sprayed with, or soaked in, the composition. The parts may be dipped into tanks filled with the composition to prevent corrosion and buildup of contaminants.

There are many types of contaminants associated with oil processing equipment, such as oils, paraffins, asphalts/asphaltenes, sulfur, tar by-products, sludge and other viscous materials. The composition of the present invention can be used to remove any one or more of the contaminants associated with oil recovery, transmission and processing.

In some embodiments, the methods of the subject invention are used for cleaning lipids and fats, oils and greases (FOG) from the surfaces of industrial and mechanical equipment. For example, in some embodiments, the subject invention can be used to clean FOG and other contaminants from, for example, drains, pipes, tubes, automobiles, engines, motors, gears and other mechanical equipment. This is particularly useful in the case of equipment having, for example, moving parts that require lubrication with greases or oils. In some embodiments, the FOG is present in or on restaurant and kitchen equipment, such as, for example, a counter, oven, stove, grease trap, sink, utensil, floor, drain or a part thereof.

In certain embodiments, the mechanical equipment includes motors or engines upon which oil and grease have accumulated. Often, the presence of oil and grease on an engine signify the presence of a leak; however, the oil and grease, and other contaminants that might adhere to the oil and grease, can make it difficult to detect the location of the leak. By cleaning the oil, grease, and other adherents from an engine, the methods of the subject invention can thus be useful in the detection and repair of engine leaks.

In certain embodiments, the subject invention can be used to unclog pieces of equipment in or on which contaminants have accumulated. For example, in one embodiment, the piece of equipment is a conduit, such as a drain, pipe or tube, that has been clogged completely or nearly completely by contaminants.

In yet another embodiment, the industrial equipment is a clogged grease trap (or grease recovery device, grease converter, or grease interceptor), such as those used in restaurants, kitchens, food processing factories, slaughterhouses, and car washes. Grease traps are plumbing devices used for trapping or intercepting greases and solid waste substances before they enter a wastewater disposal system. A clogged grease trap can mean any part of the grease trap is clogged, including the crossover, incoming or outgoing lines, or that the primary compartment of the grease trap is full of collected FOG solids, because, for example, of failure to consistently empty the collected solids.

In certain embodiments, unclogging of the equipment or conduit can be achieved by dispensing the composition of the subject invention into the clogged equipment or conduit and allowing the composition to clear the clog. Optionally, the method when used for unclogging a conduit, can further comprise agitating, or mechanically or physically disrupting the contaminant that is causing the clog. For example, a drill, corkscrew, snake, brush, or high pressure spraying device can be used for such purposes.

In some embodiments, the present invention can be used to remove odors emitted from grease traps, drains, septic tanks, discharge water (e.g., from industrial meat and poultry processing and packing plants), lift stations, and municipal systems by removing odor-causing contaminants present therein.

In one embodiment, the subject invention provides methods of cleaning surfaces of equipment and other structures, the method comprising mixing a yeast-based composition of the subject invention with a liquid to form a cleaning solution; and spraying the equipment or other surface with the cleaning solution at high pressure using a pressurized spray device, such as a power washer or pressure washer. The liquid can be water or another mild cleaning solution.

In preferred embodiments, high pressure is defined as 1,000 psi to 10,000 psi. The exact pressure can vary depending upon the type of contaminant and the type of equipment being cleaned. In one embodiment, the pressure can range from about 1,000 to about 2,000 psi for smaller, household-type cleaning, from about 2,000 to about 3,000 psi for moderately-sized tasks, or from 3,000 to about 7,000 or 8,000 psi for larger scale, industrial cleaning jobs.

Power or pressure washers are often used to clean, for example, the sides of buildings and other structures, screens, sidewalks and patios, automobiles, boats, airplanes, lawn equipment, grates, fences, walls, floors, grills and heavy machinery, such as agricultural equipment contaminated with fertilizers, herbicides, grease, oil, pesticides, and dust. Advantageously, the subject yeast-based compositions, when used in a power washer solution, can be more effective at removing contaminants than, for example, using water alone or even other harsh chemicals.

In certain embodiments, the biosurfactants can work synergistically with solvents, enzymes and other metabolites that are also produced by the yeasts.

EXAMPLES

A greater understanding of the present invention and of its many advantages may be had from the following examples, given by way of illustration. The following examples are illustrative of some of the methods, applications, embodiments and variants of the present invention. They are not to be considered as limiting the invention. Numerous changes and modifications can be made with respect to the invention.

Example 1—Yeast Fermentation Products "Star3" and "Star3+"

In one embodiment, the subject invention provides a yeast fermentation product that can be used to clean contaminants or other fouling substances from industrial equipment. The yeast fermentation product can be obtained via cultivation of a biosurfactant-producing and/or metabolite-producing yeast, such as, for example, *Pichia anomala* (Wickerhamomyces *anomalus*) (referred to herein as "Star3+" treatment). The fermentation broth after 7 days of cultivation at 25-30° C. can contain the yeast cell suspension and, for example, 4 g/L or more of biosurfactant.

The yeast fermentation product can also be obtained via cultivation of a biosurfactant-producing and/or metabolite-producing yeast, such as, for example, Starmerella *bombicola* (referred to herein as "Star3" treatment). The fermentation broth after 5 days of cultivation at 25° C. can contain the yeast cell suspension and, for example, 150 g/L or more of biosurfactant.

Example 2—Fermentation of Starmerella *Bombicola* for Sophorolipid (SLP) Production in a 550 Gallon Reactor A portable, fully enclosed reactor, designed specifically for yeast growth and biosurfactant production, is operated by PLC and comprises water filtration, a temperature control unit, an impeller and a microsparger. The reactor has a working volume of 500 gallons when growing S. *bombicola* for SLP production.

In preferred embodiments, the nutrients for SLP production comprise glucose, urea, yeast extract, and used vegetable oil.

The reactor is inoculated with 50 liters of liquid culture grown in another reactor. The duration of the cultivation cycle for SLP production is 5 days, at 25° C. and pH 3.5. The final concentration of SLP is roughly 10-15% of working volume, containing 70-75 gallons of SLP.

The culture can be collected into a separate tank. After SLP is allowed to settle to the bottom of the tank, it can be removed and processed as desired. The remaining (approximately) 420 gallons of culture in the tank can comprise from 3-5 g/L of residual SLP.

Example 3—Fermentation of Wickerhamomyces *Anomalus* for Producing Cell Biomass A movable airlift reactor operated by PLC with water filtration, temperature control unit, and microsparger for sufficient aeration is used. The process can be carried out as batch cultivation process. The 800 gallon reactor is specifically designed for growing yeasts and has a working volume of 700 gallons when growing Wickerhamomyces.

In preferred embodiments, the nutrients comprise glucose, urea, yeast extract, and used vegetable oil. Inoculation of this reactor requires up to 5% liquid seed culture of working volume. The duration of the cultivation cycle is 24-30 hours, at a temperature 25-30° C. and pH 3.5-4.5.

The final product comprises 25-30 gallons of liquid culture inoculum. Because of the short duration of fermentation, the final product does not contain biosurfactants. Sophorolipids can be added to the product at a concentration of about 1-3% or 1-1.5% if desired.

Example 4—Paraffin Dissolution

An experiment can be conducted to show the efficacy of Starmerella *bombicola* and/or Wickerhamomyces *anomalus*, compared with other microbial and/or chemical emulsification products, for paraffin degradation efficacy.

Solid paraffin is obtained from an oil field. Four grams of solid paraffin are added into a Falcon tube and 20 mL of each treatment can be added to the tubes. Falcon tubes with a working volume of 25 mL can be used.

All tubes can be place horizontally in an incubator at 30° ° C. to 40° C. and gently mixed. After different incubation times (1, 2, or 4 days) the tubes can be collected and analyzed.

In one experiment, carried out at 35° C., Star3 treatment showed complete spreading within the tubes, and completely turned the paraffin into liquid.

Example 5-Cleaning a Storage Tank Containing Sludge

An oil storage tank comprising accumulated sludge can be cleaned using the subject invention. Wickerhamomyces

*anomalus* with 1% SLP added can be applied to the tank (1 unit of sludge: 2 units of treatment).

The treatment and sludge are mixed using, for example, a tube to inject air and agitate the mixture. After two hours, the mixture separates into three layers: a top hydrocarbon later, a middle water layer (with some yeast cells), and a bottom solids layer comprising sand, scale, bitumen, asphaltenes, paraffins, etc.

The hydrocarbon layer can be pumped out for further processing. The water layer can also be pumped out for further processing. The sand and other remaining solids can then be easily removed using a shovel or a vacuum.

We claim:

1. A method for cleaning a contaminant from a surface, wherein the method comprises:

applying a cleaning composition comprising an inactive Starmerella *bombicola* a yeast and a sophorolipid growth by-product thereof and a solvent selected from isopropyl alcohol and ethyl acetate, to the surface; and removing the cleaning composition and the contaminant from the surface, and wherein the surface is restaurant or kitchen equipment, or a part thereof.

2. The method of claim 1, wherein the cleaning composition is applied to the surface by spraying.

3. The method of claim 2, wherein the spraying is achieved using a spray bottle.

4. The method of claim 2, wherein the spraying is achieved using a pressurized spraying device, and wherein the composition is sprayed at a pressure of 1,000 psi to 7,000 psi.

5. The method of claim 4, wherein the pressurized spraying device is a power washer or pressure washer.

6. The method of claim 1, wherein the cleaning composition is rubbed, spread or brushed onto the surface using a cloth or brush.

7. The method of claim 1, wherein applying the cleaning composition comprises dipping, dunking or submerging the surface into a container having the cleaning composition therein.

8. The method of claim 1, wherein removing the cleaning composition and contaminant comprises rinsing or spraying water onto the surface.

9. The method of claim 1, wherein removing the cleaning composition and contaminant comprises rubbing or wiping the surface with a cloth until the cleaning composition and contaminant have been freed from the surface.

10. The method of claim 9, wherein the surface is rinsed or sprayed with water prior to and/or after rubbing or wiping the surface with the cloth.

11. The method of claim 1, wherein the sophorolipid growth by-product is a product of fermentation of the yeast, and is present in a broth resulting from the fermentation.

12. The method of claim 1, wherein the cleaning composition comprises the sophorolipid growth by-products without the yeast.

13. The method of claim 1, wherein the cleaning composition further comprises a biosurfactant selected from rhamnolipids and mannosylerythritol lipids.

14. The method of claim 1, wherein the contaminant comprises one or more contaminants selected from fats, oils and greases (FOG); paraffins; waxes; resins; biofilms; scales; sludge; dirt and dust.

15. The method of claim 1, wherein the restaurant and kitchen equipment is a counter, oven, stove, grease trap, sink, utensil, floor, drain or a part thereof.

16. The method of claim 1, wherein the method is used to unclog a conduit selected from a drain, tube, pipe and grease trap.

* * * * *